(12) United States Patent
Teerman et al.

(10) Patent No.: US 9,435,309 B2
(45) Date of Patent: Sep. 6, 2016

(54) FUEL CONTROL VALVE

(71) Applicant: Buescher Developments, LLC, Cleveland, OH (US)

(72) Inventors: Richard F. Teerman, Wyoming, MI (US); Anh Pham, Pepper Pike, OH (US)

(73) Assignee: BUESCHER DEVELOPMENTS, LLC, Cleveland, OH (US)

(*) Notice: Subject to any disclaimer, the term of this patent is extended or adjusted under 35 U.S.C. 154(b) by 111 days.

(21) Appl. No.: 14/296,688

(22) Filed: Jun. 5, 2014

(65) Prior Publication Data

US 2015/0354521 A1 Dec. 10, 2015

(51) Int. Cl.
| | |
|---|---|
| F02M 61/04 | (2006.01) |
| F02M 51/00 | (2006.01) |
| F16K 31/06 | (2006.01) |
| F02M 63/02 | (2006.01) |
| F02M 51/06 | (2006.01) |
| F02M 57/02 | (2006.01) |
| F02M 47/02 | (2006.01) |
| F02M 63/00 | (2006.01) |

(52) U.S. Cl.
CPC ....... *F02M 63/0225* (2013.01); *F02M 47/027* (2013.01); *F02M 51/061* (2013.01); *F02M 57/023* (2013.01); *F02M 63/0035* (2013.01)

(58) Field of Classification Search
CPC ............ F02M 51/061; F02M 51/0664; F16K 27/0254; F16K 27/029; F16K 31/0624; F16K 31/0655; F16K 31/0658

USPC ........ 239/533.11, 533.12, 533.2, 584–585.5; 251/129.02, 129.15
See application file for complete search history.

(56) References Cited

U.S. PATENT DOCUMENTS

| | | | | |
|---|---|---|---|---|
| 5,443,209 A * | 8/1995 | VanAllsburg | .......... | F02M 59/44 123/446 |
| 5,862,995 A * | 1/1999 | Wu | .......... | F02M 57/02 239/533.2 |
| 5,937,520 A * | 8/1999 | Earhart | .......... | B21K 25/00 29/517 |
| 5,944,047 A * | 8/1999 | Veret | .......... | B60G 17/056 137/454.6 |
| 6,089,470 A * | 7/2000 | Teerman | .......... | F02M 57/023 239/88 |
| 6,158,419 A * | 12/2000 | Jett | .......... | F02M 57/02 123/446 |
| 6,982,619 B2 * | 1/2006 | Nussio | .......... | F02M 59/366 335/262 |
| 8,689,760 B1 * | 4/2014 | Pham | .......... | F02M 63/0077 123/188.1 |
| 2007/0170287 A1 * | 7/2007 | Pham | .......... | F02M 57/023 239/585.1 |
| 2014/0145100 A1 * | 5/2014 | Ishibashi | .......... | F16K 39/024 251/129.15 |

* cited by examiner

*Primary Examiner* — Marina Tietjen
*Assistant Examiner* — Seth W MacKay-Smith
(74) *Attorney, Agent, or Firm* — Pearne & Gordon LLP

(57) ABSTRACT

In an electronically operated fuel control valve for a diesel engine, a poppet valve with a stem having a guide surface length portion in a guide bore exposed to a large axial fuel pressure gradient during a fuel injection event, the radial space between the guide surface length portion and the bore being different proximal to a head of the poppet valve than the radial space between such elements distal from the head.

5 Claims, 2 Drawing Sheets

FUEL CONTROL VALVE

BACKGROUND OF THE INVENTION

The invention relates to fuel control valves for diesel engines.

PRIOR ART

Electronically operated control valves for injecting fuel to the cylinders of a diesel engine are generally known. The mechanical parts of such valves are produced with high dimensional precision so that their performance is predictable, uniform and long lived. U.S. Pat. No. 6,089,470 discloses a fuel control valve assembly. This patent suggests that the cylindrical valve stem and its cylindrical guide bore be provided with a larger radial clearance and shorter guide length than had previously been practiced. According to the patent, the increased clearance fit and reduced guide length improve valve sealing ability initially and over the life cycle of the product; the increased clearance and reduced guide length are indicated to allow the valve to find its optimum sealing position. However, both these dimensional departures from earlier practice tend to increase leakage of fuel along the stem and guide bore from the high pressure source. This leakage can adversely affect fuel control efficiency.

SUMMARY OF THE INVENTION

The invention provides a diesel fuel injection control valve that achieves a requisite self-alignment capacity between the valve head and seat and which limits high pressure fuel leakage between the valve stem and guide bore. In the illustrated embodiment, these results are obtained by tapering the guide bore so that it is at a maximum size adjacent the seat and a minimum size remote from the seat. This geometry allows the valve head to radially locate so that its center coincides with the center of the valve seat. Additionally, the narrow fit of the valve stem and tapered guide bore distal from the seat restricts leakage along the valve stem to a fraction of what would occur if the fit were loose along the full length of the guide bore. The result, besides a positive, repeatable and long lasting seal, is that greater control efficiency of the ejection event is obtained thereby affording, for example, higher injection pressure and/or shorter duration.

DESCRIPTION OF THE PREFERRED EMBODIMENT

Figures 1, 3:
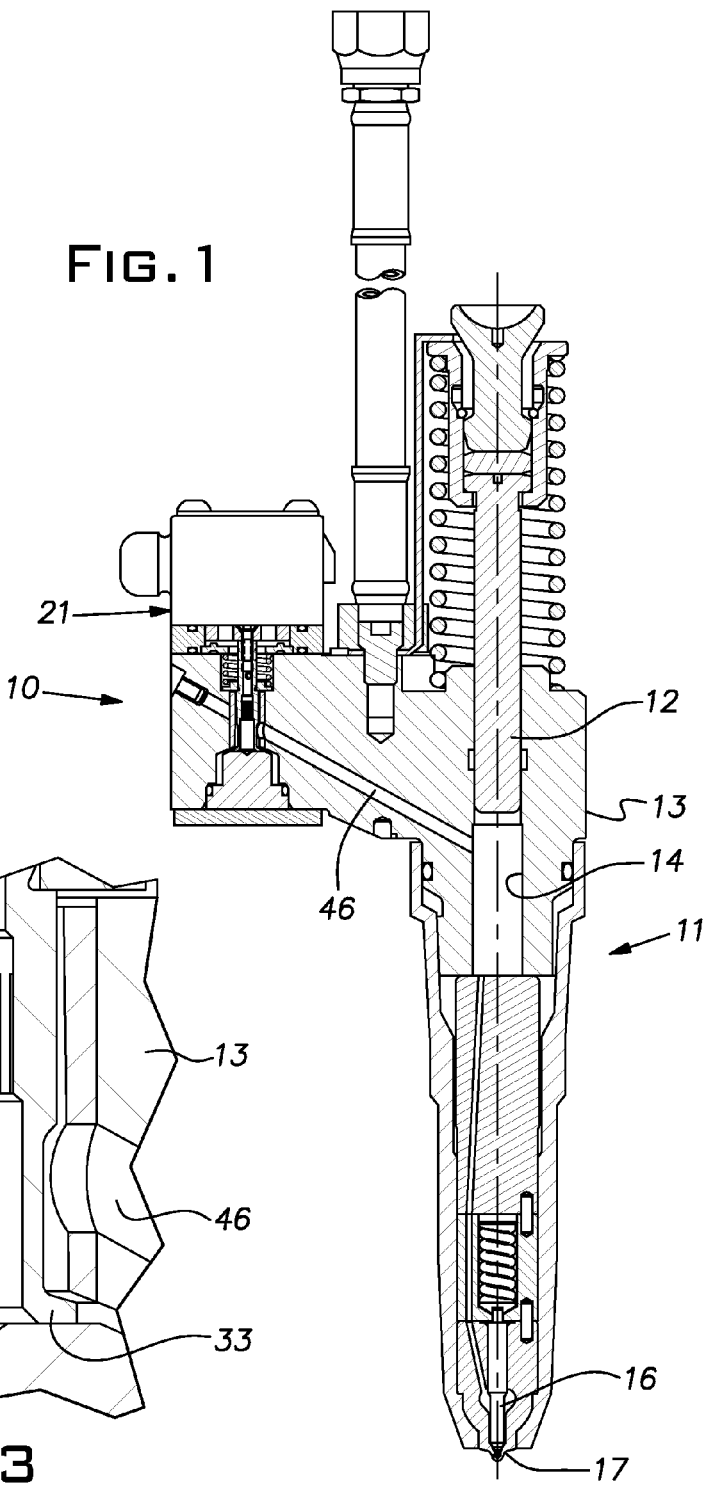
FIG. 1 is a cross-sectional view of an electronic unit injector.
FIG. 3 is a fragmentary cross-sectional view, on a greatly enlarged scale, of a poppet valve and a valve guide bore of the control valve.
Figure 2:
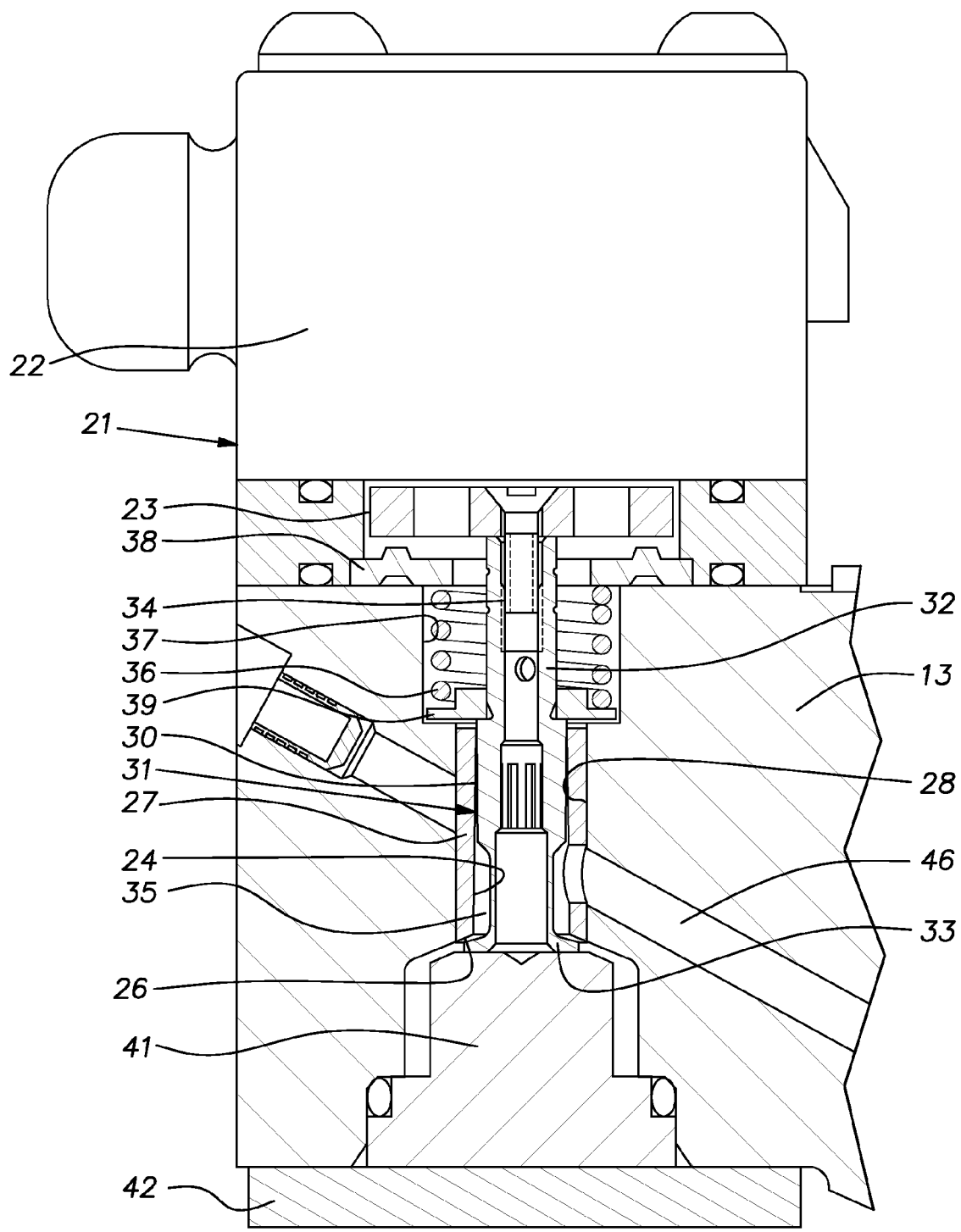
FIG. 2 is a cross-sectional view on an enlarged scale of a control valve of the invention.

A control valve 10 of the invention is shown in an electronic unit injector (EUI) 11 for a diesel engine. In a conventional manner, a plunger 12 within a body 13 of the injector 11 displaces fuel from a chamber 14. The control valve 10, when it is open, allows fuel to escape the chamber 14. When the valve 10 is closed, pressure builds in the chamber 14 until a needle 16 opens an injector nozzle 17 and fuel is injected into an engine cylinder.

The control valve 10 is operated electronically by energizing a solenoid 21 comprising a stator 22 and an armature 23. The control valve 10 is housed in the injector body 13. The control valve 10 has a guide bore 24 terminating at one end at a seat 26. In the illustrated arrangement, the bore 24 and seat 26 are provided by a cylindrical sleeve 27 pressed into a bore 28 in the body 13. Alternatively, one or both of the valve guide bore 24 and seat 26 can be provided by the body 13. A hollow poppet valve 31 has a stem 32 with a precision ground cylindrical guide surface 30 slidably mounted in the guide bore 24 for axial movement. The poppet valve 31 has, at one end, an annular head 33 for sealing the valve seat 26. Between the guide surface 30 and head 33 the stem 32 includes a reduced diameter neck 35. An end of the stem 32 distal from the head 33 is internally threaded to receive a screw 34 that fixes the poppet valve 31 to the armature 23. A compression spring 36, disposed in a counter bore 37, encircles the stem 32 and biases the poppet valve 31 to an open position where the head 33 is spaced from the seat 26. The spring 36 is maintained in a compressed state by a retainer plate 38. The spring 36 acts on the poppet valve 31 through an annular plate 39. A valve stop 41 limits movement of the poppet valve 31. The valve stop 41 is held in place by a retainer plate 42.

When a voltage is applied to the stator 22 by the electronic control module of the diesel engine, a magnetic field draws the armature 23 towards the stator. The magnetic force is sufficient to overcome the biasing force of the spring 36. The armature 23 pulls the poppet valve 31 against the seat 26 closing the valve 10. With the control valve 10 closed, the plunger 12 can develop hydraulic pressure in the fuel in the order of thousands of psi. To prevent leakage across the valve seat 26, the contact pressure between the valve head 33 and seat must be sufficient to create a seal. The closing force applied by the solenoid 21 is limited due to space restrictions, cycle times, and energy dissipation requirements. Since the closing force is limited, the contact area between the valve seat 26 and poppet head 33 must be relatively small to develop a high contact pressure.

A passage 46 in the body 13 allows fuel to be dumped when the plunger 12 is driven towards the nozzle 17 while the valve head 33 is open, i.e. displaced from the seat 26. Fuel is received from the passage 46 into the bore 24 and is distributed about the valve stem 32 at an annular reduced diameter part 35 of the valve stem. This annular zone is in direct communication with the valve seat 26. When the valve head 33 is off the valve seat 26, fuel is discharged through the space surrounding the valve stop 41. When the valve head 33 closes on the seat 26, fuel being displaced by the plunger 12 nearly instantaneously reaches a high pressure in the order of 15,000 psi. At a predetermined pressure, the needle 16 opens to inject fuel through the nozzle 17 into an associated engine cylinder. The chamber or counterbore 37 at the end of the guide bore 24 remote from the seat 26 holds fuel at a supply pressure of, for example, 80 psi. Thus, during an injection event, there is a very large pressure differential axially across a guide surface 30 of the valve stem 32 that is essentially equal to the injection pressure.

The guide surface 30 is smaller in diameter than the surrounding part of the guide bore 24 to permit the valve stem 32 to move freely along the central axis of the bore 24. The valve stem 32, valve head 33 and guide bore 24 are produced to exacting dimensional tolerances. Despite the care exercised in producing these parts, there typically is some eccentricity between the valve head 33 and the stem guide surface 30 as well as between the valve seat 26 and guide bore 24.

The practically unavoidable eccentricities in these parts have the potential to leave the valve head 33 unable to properly register and seal on the seat 26. As discussed above, it is known to increase the clearance between a valve stem guide surface and a guide bore as well as to shorten the length of the valve stem guide surface with the intent of leaving the valve head somewhat radially unconstrained and thereby capable of finding a proper seating position where it is concentric with the valve seat. This approach creates a larger leakage path for high pressure fuel between the valve stem guide surface 30 and guide bore 24 from the annular area surrounding the reduced diameter neck 35 of the stem 32 to the counterbore or chamber 37. The present invention reduces this leakage problem while allowing sufficient radial freedom for the valve head 33 to align itself concentrically with the seat 26. The present invention resides in a tapered or variable spacing between the valve stem guide surface 30 and guide bore 24 with the space being a minimum at an end of the stem guide surface distal from the valve head and a maximum proximal to the valve head. In the presently preferred arrangement, this tapered spacing is achieved by providing a tapered guide bore 24 and a cylindrical ground guide surface 30.

FIG. 3 illustrates this variable space on a greatly exaggerated scale. A narrow space 52 exists at a point remote from the valve head 33 and a greater space 53 at the end of the guide surface 30 proximate to the valve head. In the illustrated example, the taper is straight, i.e. described by an imaginary straight line in a plane common with the bore axis and oriented at a shallow angle to the bore axis and rotated about the bore axis. The tapered space between the stem guide surface 30 and guide bore 24 allows a relatively high degree of radial self-adjustment of the valve head 33 relative to the seat 26 so that an effective seal can be obtained between these elements. Importantly, the tapered space serves to limit leakage along the stem guide surface 30 from the cyclically highly pressurized space surrounding the reduced diameter section 35 of the valve stem. It can be demonstrated with fluid mechanics calculations that this leakage can be reduced, for example, to at least about ⅓ and, more preferably, about ½ of what would occur if the cross-sectional area of the space was constant from the end of the guide surface 30 proximal to the valve head 33. By way of example, but not limitation, this can be demonstrated for a valve having a stem guide length of 9.1 mm and a nominal diameter of 7.0 mm with a minimum diameter difference between the stem guide surface 30 and the guide bore 24 of 2.5 microns and a maximum diameter difference of 4.6 microns.

The benefit of reduced fuel leakage over the stem guide surface can be obtained by reversing the location of the small and large diametral difference. In such an arrangement, a small diameter difference between the stem guide surface and the guide bore can exist at a part of the stem guide length proximal to the valve head and a larger diameter difference between the stem guide length and the guide bore can exist distal from the valve head. Such an arrangement can be proportioned to provide sufficient radial freedom for the valve head to adjust to the center of the valve seat.

A difference in the radial space between the stem guide surface and the guide bore can be achieved, as an alternative to the disclosed tapered guide bore 24, by tapering the stem guide surface, by tapering both the stem guide surface and guide bore, by stepping the stem guide surface diameter, by stepping the guide bore diameter or by stepping both the stem guide surface diameter and the guide bore diameter.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited. For example, the control valve can be used with an electronic unit pump to control injection to a cylinder.

What is claimed is:

1. An electrically operated fuel control valve assembly for a diesel engine, the valve assembly including a body, a stator, an armature in a chamber adjacent the stator, a bore including a guide portion in the body, a poppet valve in the bore including a head and a stem, an annular valve seat adjacent an end of the bore, the armature being fixed to an end of the stem remote from the head, a spring biasing the valve head away from the seat, the stem having a guide surface guided by contact with the bore guide portion for movement to seat and unseat the head on the seat, an annular zone established radially between the stem and bore and axially between the guide surface and the head, the annular zone having a radial spacing between the stem and bore substantially greater than a maximum spacing between the guide surface and guide portion, wherein the annular zone contains fuel pressurized to injection pressure when the head seals the seat, the stem guide surface being smaller in diameter than a diameter of the bore guide portion, a difference in diameters of the guide surface and the bore guide portion being different at a location proximal to the seat compared to a location distal from the seat and whereby the head can align with the seat regardless of expected eccentricities between the bore guide portion and seat and between the stem guide surface and head, and whereby fluid leakage from the annular zone to the chamber is reduced from that which would occur where the difference in diameter between the stem guide surface and the bore guide portion was constant and sufficiently large to provide adequate radial freedom of the head to adjust for expected eccentricities between the seat and bore and between the stem guide surface and head.

2. A fuel control valve as set forth in claim 1, wherein the difference in diameters of the guide surface and the bore guide portion is greater at a location proximal to the seat compared to a location distal from the seat.

3. A fuel control valve as set forth in claim 2, wherein the bore guide portion is tapered and the guide surface is cylindrical.

4. In an electronically operated fuel control valve for a diesel engine, a poppet valve with a bore having a guide portion and a stem having a guide surface length portion in the bore guide portion and engageable with the bore guide portion, the stem having a clearance length portion in the bore between the guide surface length portion and a head of the poppet valve wherein the clearance length portion is maintained out of contact with the bore by the guide surface length portion, the bore being exposed to a large axial fuel pressure gradient during a fuel injection event, the radial space between the guide surface length portion and the bore guide portion being different proximal to the head of the poppet valve than the radial space between such elements distal from the head.

5. A fuel control valve as set forth in claim 4, wherein the radial space between the guide surface length portion and the bore guide portion is greater proximal to the poppet valve head than the radial space distal from the head.

* * * * *